March 31, 1970  L. J. HAINNEVILLE  3,503,619
SEALING GASKET
Filed Sept. 12, 1966
FIG. 1
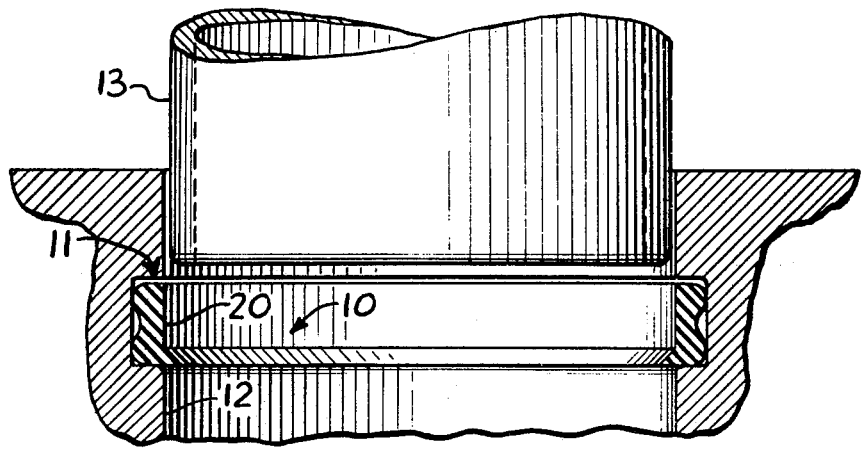
FIG. 2   FIG. 3   FIG. 4
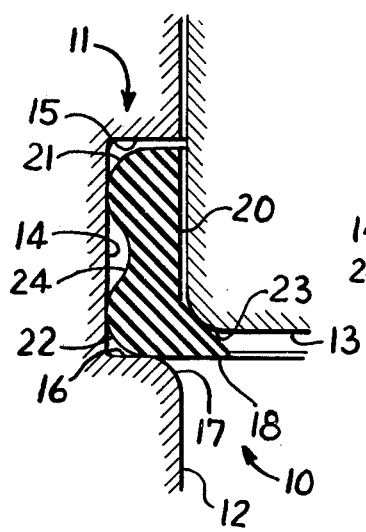 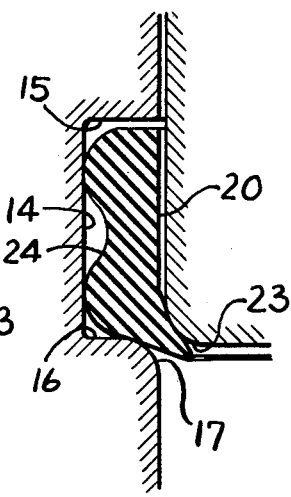 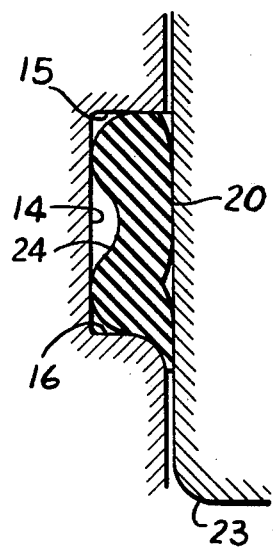
INVENTOR
LUCIEN JEAN HAINNEVILLE
by: Wolfe, Hubbard, Voit & Osann
ATTYS.

United States Patent Office 3,503,619
Patented Mar. 31, 1970

3,503,619
SEALING GASKET
Lucien Jean Hainneville, Cleon-par Saint Aubin les Elbeuf, France, assignor to Inland Steel Company, Chicago, Ill., a corporation of Delaware
Filed Sept. 12, 1966, Ser. No. 578,693
Claims priority, application France, Sept. 14, 1965, 31,299/65
Int. Cl. F16j 15/32, 15/54
U.S. Cl. 277—208       7 Claims This invention relates generally to deformable seals which are retained in a groove in one of two adjoining members. In greater particularity, the present invention relates to the sealing of mating coaxial members which are relatively slidable or rotatable, as exemplified by an extensible spout for pouring liquid or granular material from a container.

Sealing gaskets of the type adapted to be retained by a groove in one of two coaxial cylindrical members are in wide use. They may be used, for example, to seal the linear axial movement of a hydraulic piston or pump, or may find equally advantageous use as a seal for a rotating shaft in a pump or engine. Such seals may also be applied to containers or container closures in which a cylindrical pouring spout is slidably retained in a lid or plug from which it may be conveniently extended when it is desired to pour the contents of the container.

In structures of the type thus far described, it is common to utilize a sealing gasket made of rubber or other elastomeric material. The gasket is retained within a suitable groove provided in one of the two mating members. However, in some cases the use of rubber for this purpose is made undesirable or even impossible because of the nature of the seal environment. For instance, with an extensible pouring spout in a container for use with aggressive or corrosive commodities, a rubber gasket may swell or be otherwise seriously degraded in its sealing properties. In other applications rubber may have too great a coefficient of friction, making the seal unnecessarily tight and causing sticking or binding. In such cases it will often be necessary to substitute a synthetic rubber-like material. However, many of these synthetic materials are considerably less resilient than rubber, although being reasonably deformable. As a result, the sealing ability of gaskets of the conventional "O-ring" type may be so inferior with synthetic gaskets that the advantages of the seal are lost or greatly reduced.

In view of the foregoing requirements, it is an object of the present invention to provide a sealing gasket of deformable material which achieves a reliable seal without depending for the effectiveness of the seal on a high degree of inherent resilience. A related object is to cause the creation of sealing contact at more than one point along the sealing face as the seal is deformed by assembly of the members to be sealed.

A further object is an effective seal of the above description which will not tend to be pushed out of its channel or otherwise dislodged when the two mating members to be sealed are assembled. In this connection, it is also an object to cause the seal to deform progressively on assembly, so that the sealed members are substantially in sealing position adjacent the seal itself before the seal becomes fully effective.

Other objects and advantages of the invention will become apparent upon reading the following detailed description and upon reference to the drawings, in which:

FIGURE 1 is a cross-section of the seal of the present invention as used with a tubular cylindrical member slidable within a bore as used, for example, in an extensible pouring spout;

FIG. 2 is an enlarged fragmentary vertical section similar to FIG. 1 in which the slidable member is shown about to engage the seal;

FIG. 3 is a section similar to FIG. 2 in which the seal has begun to deform under the urging of the slidable member as it moves downward in the bore; and FIG. 4 is a cross-section similar to FIG. 2 in which the slidable member has moved completely past the seal, thereby bringing the seal into full sealing engagement.

While the invention is described in connection with a preferred embodiment, it will be understood that it is not intended that the invention be limited to that embodiment, but it is instead intended to cover all alternative and equivalent constructions as may be included within the spirit and scope of the invention as defined by the appended claims.

Turning first to FIGURE 1, there is shown an exemplary sealing gasket 10 embodying the features of the present invention. The gasket 10 is retained within an annual gasket channel 11 formed in a bore 12 in which a tubular central member 13 is slidable. Such a configuration is useful, for example, as an extensible pouring spout for sealed containers. In such an application, the central member 13 would comprise a spout, while the bore 12 would be formed within a plug or lid inserted in the container.

As viewed in FIGS. 2, 3 and 4, the gasket channel 11 is approximately rectangular in cross-section, having a bottom 14, an upper edge 15 and a lower edge 16. The sealing gasket 10 is disposed within the annular gasket channel 11 with sufficient clearance to allow a controlled amount of shifting as the seal is deformed in use. As will be seen from the drawings, a small amount of freedom is provided for the gasket 10 to shift within the channel 11 in order to accommodate the deformation caused when the member 13 is fully engaged with the gasket 10. For the purpose of preventing damage to the gasket 10 during assembly and use, a radius or lip 17 is provided on the edge of the channel 11 most remote from the end of the bore 12 into which the spout 13 is assembled. In the illustrated embodiment, the spout 13 is inserted from above and therefore the radius 17 is located at the lower edge 16.

In accordance with one of the important aspects of the invention, the sealing gasket 10 is formed with an inwardly projecting annular tongue 18 which, before deformation, protrudes inwardly from the gasket channel 11. When the adjoining member 13 is moved into engagement with the gasket 10, the tongue 18 is deflected over to one side and against the lip 17, thereby deforming the gasket in such a way as to bring an adjoining portion of the gasket in addition to the tongue into sealing contact with the adjoining member. In this way, a double line of sealing contact is assured. The sealing action according to the invention is primarily achieved through the flexing of the sealing gasket 10 rather than through simple compressive deformation as is the case with other types of seals. The use of relatively non-resilient synthetic plastic materials which are impervious to liquids and resistant to aggressive and corrosive chemicals is thereby made possible.

Pursuant to the invention, the inwardly extending annular tongue 18 does not lie flush with the bore 12, but protrudes considerably beyond the surface of the bore 12 to engage the spout 13 on assembly. The gasket 10 has a generally cylindrical inner surface 20 which is otherwise substantially flat, and lies parallel with or slightly recessed from the surface of the bore 12. The tongue 18 preferably has a triangular cross-section, with an apex disposed in a plane substantially flush with the lower edge gasket 10 as illustrated in the figures.

Further in keeping with the invention, the gasket 10 has rounded inner corners 21, 22 which define convex beads which do not fully penetrate into the corners formed by the intersection of the channel bottom 14 with the channel upper and lower surfaces 15, 16. In this way, the gasket 10 is allowed to shift or rotate somewhat within the channel 11 as may be necessary to achieve complete sealing.

In carrying out the invention, the tube 13 is assembled by introducing it into the bore 12 and sliding it into engagement with the gasket 10. Upon passing over the gasket inner surface 20, little or no contact may be made, but upon encountering the tongue 18, the gasket is deformed into sealing engagement in a manner which results in a highly effective seal. As the tube 13 moves past the tongue 18, the lower bead 22 rotates slightly as the tongue is deflected, causing the gasket 10 to buckle in a manner which arches the gasket inner surface 20 and urges its midpoint inward into sealing engagement with the tube 13. The upper bead 21, also being rounded, may also rotate in a complementary fashion allowing the gasket 10 to assume a final position as illustrated in FIG. 4 in which two regions of substantial sealing contact are effected. One region of contact is provided by the arched central position 20 of the seal pressing against the spout 13, and the other is provided by the compression of the tongue 18 against an adjacent portion of the spout.

A further feature of the invention lies in the provision of a groove 24 which results in a diminished cross-sectional thickness of the gasket 10 toward its midpoint, resulting in increased flexibility in this region. This result may also be achieved by making the gasket 10 and its channel 11 more shallow in form, resulting in increased flexibility of the gasket about its midpoint. The gasket 10 itself may thus be rectangular in cross-section, similar to the channel 11, but is instead preferably formed with a peripheral groove 24 formed in the surface adjacent the bottom 14 of the gasket channel 11.

It may therefore be seen that the advance of the central tube 13 pushes the tongue 18 axially and radially out of its way, causing the lower bead 22 to act as a fulcrum as the tongue 18 is pushed against the lip 17 and into the channel 11. To facilitate the introduction of the central tube 13 and to minimize the danger of cutting or otherwise damaging the gasket 10, the outer corner of the tube is preferably provided with a rounded chamfer 23 at the point of contact with the gasket tongue 18. Because the midpoint of the gasket 10 is of reduced cross-section due to the presence of the groove 24, the flexibility of the gasket at this region is increased and the inner surface 20 is more easily caused to arch and thereby create a second region of sealing contact.

In the preferred embodiment, the tongue 18 is formed in the shape of a right triangle having its lower edge parallel with the lower edge 16 of the channel 11, and flush with the gasket 10 adjacent the lower bead 22. This configuration allows the tongue 18 to rotate downward against the lip 17 as it is displaced by the chamfer 23, resulting in the desired arching of the gasket inner surface 20 and consequent sealing contact with the tube 13.

I claim as my invention:

1. A joint assembly comprising, in combination, a member having a bore, a cylindrical member spaced from and movable within said bore, said bore and said cylindrical member providing cylindrical adjoining faces, one of said members having a peripheral gasket channel adjacent to and facing said other member, said gasket channel including two planar end walls, and a sealing gasket of deformable material retained within said gasket channel, said sealing gasket having an elongate cross-section, the smaller dimension of which is perpendicular to the adjoining faces of said members, and having an annular tongue of generally triangular cross-section, said tongue including a first edge face that is flush with one edge of said gasket and perpendicular to the adjoining faces of said members and a second edge face that intersects said first edge face at an acute angle, said tongue protruding radially beyond said channel with said first edge face engaging one of said two planar end walls and said second edge face engaging said other member, said tongue being displaced relative to said channel by said other member, whereby a portion of said gasket adjacent said tongue and intermediate said elongate cross-section is urged into sealing contact with said other member.

2. The combination according to claim 1 in which said gasket is formed with diminished thickness in the region of said gasket adjacent said tongue, whereby said region may be flexibly urged into sealing contact with said other member upon displacement of said tongue by said other member.

3. The combination according to claim 2 in which the edges of said sealing gasket which seat within said gasket channel are convexly beaded.

4. The combination according to claim 2 in which said projecting tongue is of generally triangular cross-section, and having an apex extending beyond said gasket channel.

5. The combination according to claim 4 in which one edge of said tongue is flush with one edge of said gasket and perpendicular to the adjoining faces of said members.

6. The combination according to claim 4 in which the edge of said peripheral gasket channel in said one member adjacent said tongue and the edge of said other member engageable with said tongue are chamfered.

7. The combination according to claim 5 in which said one member comprises a container and said other member comprises a pouring spout slidably extendable from said container.

References Cited

UNITED STATES PATENTS

| | | | |
|---|---|---|---|
| 2,321,411 | 6/1943 | Morse | 277—209 |
| 2,615,740 | 10/1952 | Nathan | 277—209 |
| 1,924,020 | 8/1933 | Bihet. | |
| 2,337,276 | 12/1943 | Sanchis | 141—308 X |
| 2,809,853 | 10/1957 | Nathan. | |
| 2,991,092 | 7/1961 | MacKay. | |
| 3,064,983 | 11/1962 | Halterman | 285—345 X |

FOREIGN PATENTS 991,298 10/1951 France.

LAVERNE D. GEIGER, Primary Examiner

J. S. MEDNICK, Assistant Examiner

U.S. Cl. X.R.

277—207; 285—345, 349